United States Patent [19]

Jaeschke

[11] Patent Number: 4,469,968
[45] Date of Patent: Sep. 4, 1984

[54] COOLING SYSTEM FOR DYNAMOELECTRIC MACHINE

[75] Inventor: Ralph L. Jaeschke, Kenosha, Wis.

[73] Assignee: Eaton Corporation, Cleveland, Ohio

[21] Appl. No.: 510,007

[22] Filed: Jul. 1, 1983

[51] Int. Cl.³ .......................................... H02K 49/02
[52] U.S. Cl. .................................... 310/105; 310/62; 310/64; 165/86
[58] Field of Search .................. 310/93, 103, 59, 104, 310/105, 266, 67, 166, 62, 63, 64, 113, 171; 165/86

[56] References Cited

U.S. PATENT DOCUMENTS

| | | | |
|---|---|---|---|
| 2,827,580 | 3/1958 | Jaeschke | 310/105 |
| 3,316,429 | 4/1967 | Jaeschke | 310/93 |
| 3,389,280 | 6/1968 | Herrick | 310/105 |
| 3,824,684 | 7/1974 | Jaeschke | 310/64 |
| 3,845,337 | 10/1974 | Jaeschke | 310/105 |
| 3,996,485 | 12/1976 | Jaeschke | 310/103 |
| 4,362,958 | 12/1982 | Jaeschke | 310/59 |

Primary Examiner—R. Skudy
Attorney, Agent, or Firm—M. L. Union; C. H. Grace

[57] ABSTRACT

An eddy current coupling 11 includes an input member 19, an output member 21 rotatable relative to the input member about an axis of rotation, a pole assembly 29, an inductor drum assembly 25 and a field coil 41 for coupling the input and output members. The inductor drum assembly 25 includes a generally cylindrically drum portion 27 and a radially extending drum portion 26. A heat dissipating member 71 integrally formed from a heat conductive material such as aluminum is attached to the radially extending portion 26 of the inductor drum assembly. The heat dissipating member includes heat dissipating fins 75 on one side thereof and rivet means 77 on the opposite side thereof for connecting the integrally formed heat dissipating member 71 to the radially extending portion 26 of the inductor drum assembly. The rivet means 77 act to transfer heat from the inductor drum assembly 25 to the heat dissipating member 71.

14 Claims, 4 Drawing Figures

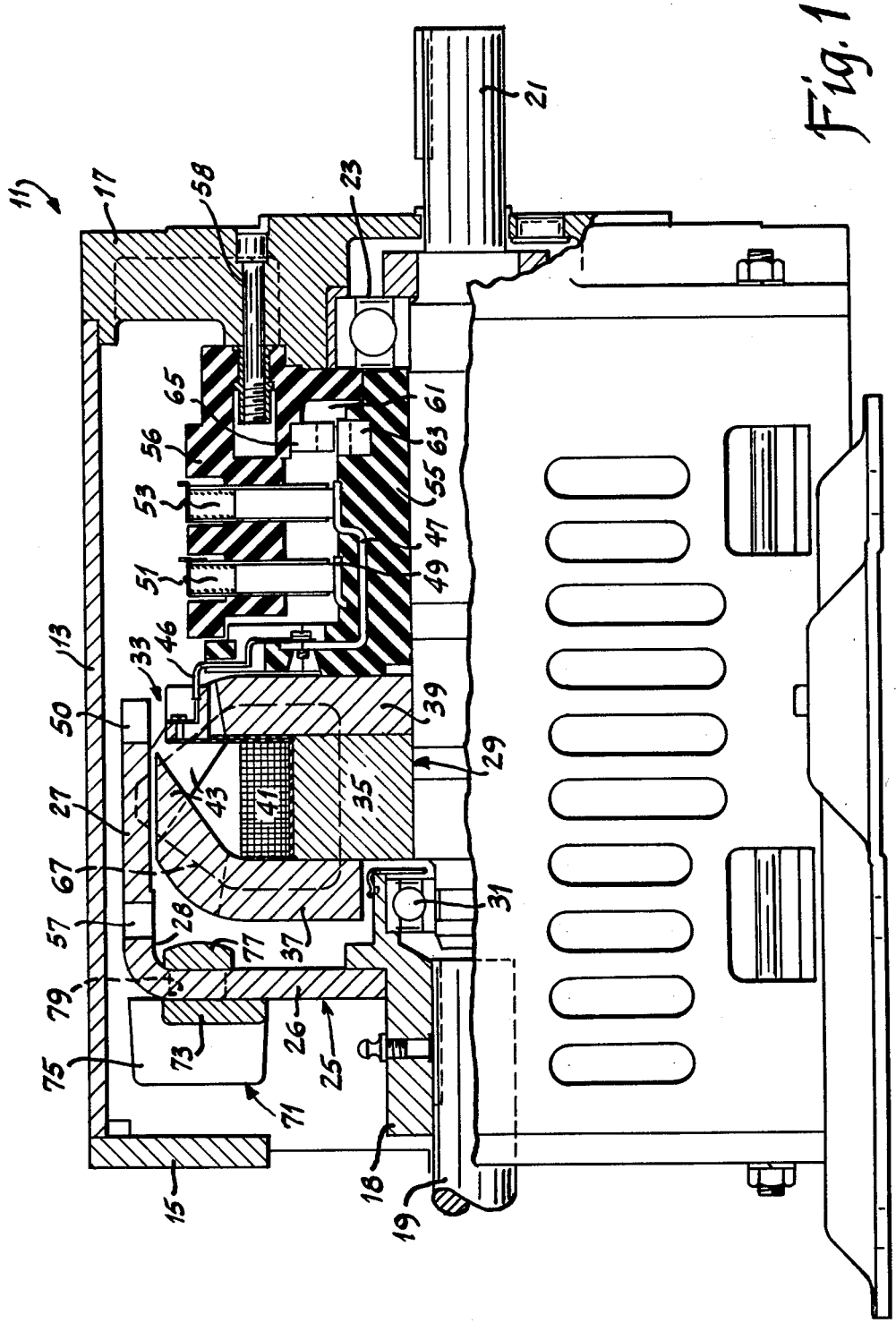

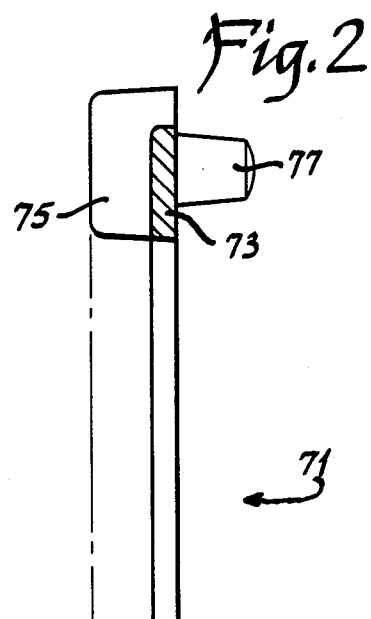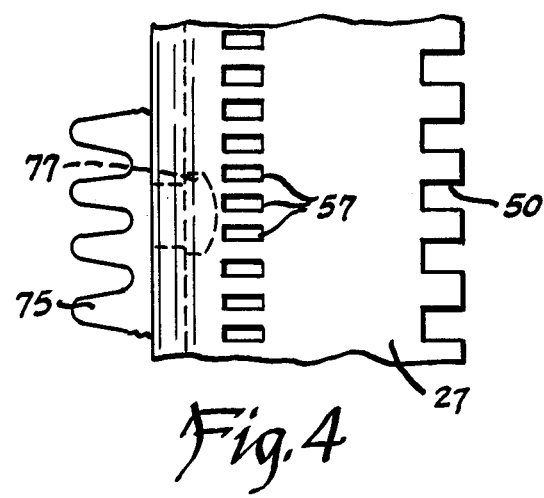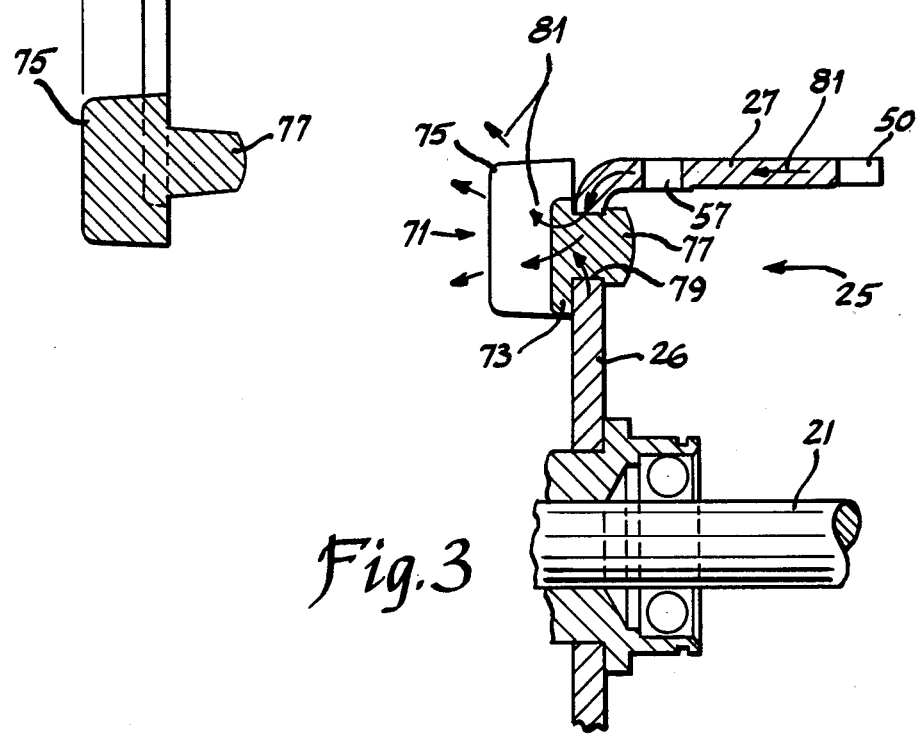

COOLING SYSTEM FOR DYNAMOELECTRIC MACHINE

BACKGROUND OF DISCLOSURE

1. Field of the Invention

The present invention relates to a electromagnetic or dynamoelectric coupling device, and more particularly to a system for dissipating heat from the inductor drum of such a device.

Electromagnetic couplings of the type are well known in the art and include a rotor which is disposed within a rotatable inductor drum. A coil is energized to generate a magnetic field which electromagnetically couples the rotor and drum so that torque may be transferred therebetween. The passage of this magnetic field through the rotor and inductor drum results in the generation of heat during the transmission of torque partially as a result of "slip" between the rotor and the inductor drum (power in=power out+slip (heat) or slip (heat)=shaft power in minus shaft power out). The dissipation of heat has long been a problem in electromagnetic couplings and many different types of cooling systems have been tried in an effort to effectively dissipate the generated heat. In general, heat build up limits the speed ratio of the coupling. Thus, by increasing the heat dissipation capability of a particular size coupling, the speed ratio for that coupling can be increased.

2. Prior Art

The Jaeschke U.S. Pat. Nos. 4,362,958 and 3,996,485 is both disclose an electromagnetic coupling and a rod cooling system therefor.

The Jaeschke U.S. Pat. Nos. 3,316,429 and 2,827,580 disclose an inductor drum and supporting construction for an electromagnetic machine. These patents discloses a steel inductor drum which includes a cast aluminum cooling fin structure integrally formed therewith by die casting onto the steel drum. While such assembly provides efficient heat dissipation from the inductor drum it is also very costly due to the fact that the aluminum must be die cast directly onto the steel drum so that the aluminum is metalugically bonded to the drum so that heat moves from the drum to the aluminum finned structure. The Wheeler U.S. Pat. No. 3,824,684 includes a method of assembling a plastic housing of an electric motor device to an aluminum heat sink by deforming plastic pins integrally formed on the housing into openings in the aluminum heat sink. The plastic does not provide a good heat conductor.

SUMMARY OF THE INVENTION

The present invention provides a new low cost and improved eddy current coupling wherein a heat dissipating member is riveted to the inductor drum to dissipate heat from the inductor drum and wherein an efficient heat conductive path is provided to conduct heat from the inductor drum, through the rivets to the heat dissipating member.

Another provision of the present invention is to provide a new and improved eddy current coupling including an input member, an output member rotatable relative to the input member about an axis of rotation, a pole assemble associated with one of the input and output members, an inductor member associated with the other of the input and output members, and a field coil associated with the pole assembly for coupling the input and output members upon energization thereof. The inductor member includes a generally cylindrical drum portion extending substantially parallel to the axis of rotation and a radially extending portion. The heat dissipating member is integrally formed from a heat conductive material, is attached to the radially extending portion of the inductor drum and includes a heat dissipating surface on one side thereof for directing heat from the heat dissipating member. Rivet means extend from the opposite side of the heat dissipating member or connecting the integrally formed heat dissipating member to the radially extending portion of the inductor member. The rivet means act to transfer heat from the inductor member to the heat dissipating member.

A further provision of the present invention is to provide a new and improved eddy current coupling as set forth in the preceding paragraph wherein the inductor member and the heat dissipating member expand upon being subject to heat and wherein the rivets means expand at a rate greater than the expansion rate of the inductor member to increase the thermo contact between the rivet means and the inductor member upon heating of the inductor member and the heat dissipating member.

A still further provision of the present invention is to provide a new and improved eddy current coupling as set forth in the preceding paragraph wherein the circumferential contact area between the plurality of rivet means and the inductor member is equal to or greater than 125% of the cross sectional area of the cylindrical portion of the inductor member taken substantially perpendicular to the axis of rotation.

Still another provision of the present invention is to provide a new and improved apparatus including first and second mechanisms wherein the first mechanism includes a metallic member rotatable relative to the second mechanism about an axis of rotation. The first and second mechanisms, during operative association, interact to generate heat in the metallic member. A heat dissipating member is provided which is integrally formed from a heat conductive material and is attached to the metallic member for rotation therewith. The heat dissipating member includes a heat dissipating surface thereon for directing heat from the heat dissipating member and fastening means formed from a heat conductive material for securing the heat dissipating member to the metallic member for rotation therewith. The metallic member includes a plurality of openings for receiving the fastening means therein to secure the metallic member to the heat dissipating member and the fastening means act to transfer heat from the metallic member to the heat dissipating member.

DESCRIPTION OF THE DRAWINGS

FIG. 1 is an axial half section of a typical dynamoelectric coupling to which the cooling system of the present invention may be adapted.

FIG. 2 is an enlarged cross sectional view of the heat dissipating member.

FIG. 3 is a fragmentary enlarged half section view of the heat dissipating member as attached to the inductor drum.

FIG. 4 is a fragmentary plan view more fully illustrating the inductive drum.

DESCRIPTION OF THE PREFERRED EMBODIMENT

FIG. 1 is a longitudinal half section of a typical eddy-current coupling device to which the present invention may be adapted. The coupling device, generally designated 11, includes a central housing 13 and end caps 15 and 17. The end cap 15 includes a central opening therein for receiving a drive shaft 19 and the end cap 17 supports a driven or output shaft 21, which in part is supported by a set of bearings 23 supported in the end cap 17.

The drive or input shaft 19 may be driven in a well known manner by a prime mover such as a motor, not illustrated. Keyed to the drive shaft 19 is an inductor assembly or inductor drum means 25 including a hub portion 18, a radially extending portion 26 and a cylindrical inductor drum portion 27 which will be described in greater detail subsequently, but which is composed of a ferro magnetic material such as steel and which may have a substantially uniform magnetic reluctance. Keyed to the driven shaft 21 for rotation therewith is a magnetic field pole assembly or rotor assembly 29. A pilot bearing 31 is located in between the hub portion 18 of the inductor assembly 25 which supports the drive shaft 19 and the pole assembly 29 to in part support the pole assembly 29 for rotation relative to the inductor assembly 25.

The field pole assembly 29 includes a magnetic pole assembly 33, comprising a magnetic ring 35 supported on the shaft 21 and a pair of pole members 37, 39. A field coil 41 is supported on the magnetic ring 35 to energize the magnetic pole assembly 33. The pole members 37 and 39 carry pole teeth or poles 43 thereon which are interdigitated. The pole teeth 43 are disposed adjacent an innersurface 28 of the cylindrical portion 27 of the inductor drum assembly 25. A narrow air gap or space is provided between the poles 43 and the innersurface 28 of the inductor drum portion 27 to provide for relative rotation between the inductor drum assembly 25 and the pole assembly 29.

The field coil 41 is energized via a pair of leads 46. Leads 46 are connected to slip rings 47 and 49 which are supported on a slip ring support 55 which is supported on the output shaft 21 for rotation therewith. A pair of brush assemblies 51, 53 are supported in a brush holder 56 which is supported on end cap 17 by the bolt and nut assembly 58. The brush assemblies 51 and 53, respectively, contact the slipings 49 and 47. The brush assemblies 51 and 53 are energized via leads, not illustrated, in a well-known manner. The brush assemblies 51 and 53 operate to transfer electrical energy to the field coil 41 via the leads 46 and slip rings 47, 49.

A tachometer generator assembly 61 may be associated with the present coupling. The tachometer generator 61 is operable to establish a signal on an output line thereof, not illustrated, which is indicative of the speed of the output shaft 21 and which signal may be utilized by electrical circuitry, not illustrated, to control the speed of the output shaft 21, in a well-known manner. The tachometer generator 61 includes a plurality of permanent magnetic poles 63 which are supported for rotation by the slip ring support member 55 which rotates with output shaft 21. A stator assembly 65 is disposed adjacent the permanent magnet poles 63 of the tachometer generator 61 and is operable to have a current induced therein, in a well-known manner, which is proportional to the speed of the output shaft 21.

Energization of the field coil 41 establishes a flux path, represented by the dotted line 67 in FIG. 1, which eletromagnetically couples the field pole assembly 29 and the inductor drum assembly 25 so that rotation of the inductor drum assembly 25 by the driven input shaft 19 effects rotation of the pole assembly 29 and output shaft 21 connected thereto in a well-known manner. The magnitude of the energization of field coil 41 controls the slip between the pole assembly 29 and the inductor drum assembly 25 in a well-known manner.

During operation of the electromagnetic coupling device 11, relative rotation between the pole assembly 29 and inductor drum assembly 25 results in the generation of eddy currents in the cylindrical portion 27 of the inductor drum. These eddy currents produce a magnetic field which permits the transmission of torque from the inductor drum assembly 25 to the pole assembly 29 as discussed above. Normally, a certain amount of "slip" occurs during the rotation of the inductor drum assembly 25 and the pole assembly 29 and such "slip", or difference in rotational speed between the pole assembly 29 and inductor drum assembly 25, generates heat in the inductor drum assembly 25. The cylinder portion 27 of the inductor drum assembly 25 includes a plurality of axially extending teeth 50 disposed on the end portion thereof. These teeth 50 and the notches inbetween act to dissipate heat generated in the cylindrical portion 27 of the inductor drum assembly 25. The teeth 50 and notches act to increase the end surface area of the cylindrical portion 27 of the inductor drum assembly 25 to thereby maximize heat dissipation. The inductor drum assembly 25 further includes a plurality of radially extending openings 57 arranged in an annular array about the cylindrical portion 27 of the inductor drum assembly 25. The openings 57 are adapted to have a cooling medium such as air flow therethrough to dissipate heat generated in the inductive drum assembly 25. The openings 57 increase the surface area of the cylindrical portion 27 of the inductive drum assembly 27 which comes in contact with the cooling medium to thereby maximize heat dissipation.

As more fully illustrated in FIGS. 2 and 3, the inductor drum assembly 25 includes a heat dissipating member 71 disposed on the radially extending portion 26 thereof. The heat dissipating member 71, more fully illustrated in FIG. 2, comprises an annular ring portion 73 having a heat dissipating surface theron which includes a plurality of fins 75 extending therefrom in a direction substantially parallel to the axis of rotation of the drum assembly 25 and a plurality of fastening means or rivets 77 which also extend parallel to the axis of rotation but in a direction opposite to that in which the fins 75 extend. The heat dissipating member 71 is operable to rotate with the inductor drum assembly 29 and dissipate heat generated in the inductor drum assembly 29 by the eddy current action. The rivet means or rivet members 77 are integrally formed with the heat dissipating member 71 and each rivet 77 is operable to be received in one of a plurality of openings 79 disposed in the radially extending portion 26 of the inductor drum assembly 25. After the rivets 77 are located in the openings 79 the heads of the rivets are deformed to secure the heat dissipating member 71 to the inductor drum assembly 25. The deformation of the rivets 77 is performed to put the rivets 77 under compression axially and expand the rivets 77 radially into the interstices caused by the hole stamping operation which places the openings 79 in the radial extending portion 26 of the inductor drum assembly. By ensuring that the rivets 77 are under compression in both an axial and a radial direction when the heat dissipating member 71 is attached to the inductor drum assembly 25, greater and more efficient thermo-contact occurs between the rivets of the heat dissipating member 71 and the inductor drum assembly 25. This provides for better heat dissipation from the inductor drum assembly 25 through the rivets 77 and to the fins 75 of the heat dissipating member 71. The fins 75 then dissipate heat to a cooling medium such as air when the inductor drum assembly 25 rotates.

It is desirable to construct the heat dissipating member 71 from a material that has a higher coefficient of expansion than that from which the radially extending portion 26 of the inductor drum is constructed. In the preferred embodiment aluminum is utilized due to its good heat conductive characteristics and due to its coefficient of expansion.

As the inductor drum assembly 25 and the heat dissipating member 71 get hotter the rivets 77 and the inductor drum assembly 25 expand. Since the inductor drum is manufactured of a ferro magnetic material such as steel and the heat dissipating member 71 is cast aluminum, the coefficient of expansion of the heat dissipating member 71 and rivets 77 will be greater than that for the inductor drum assembly 25. Since the rivet 77 and heat dissipating member 71 expand at a greater rate than the inductor drum assembly 25, heating of the inductor drum assembly 25 and heat dissipating member 71 will cause the rivets 77 to expand relative to the openings 79 to bring the rivets 77 and the annular, ring portion 73 into tighter contact with the openings 79 and the radially extending portion 26. Thus, upon heating better thermo contact and higher compression will occur between the rivets 77 and the radially extending portion 26 of the inductor assembly 35.

It should be appreciated that the establishment of the flux path 67 generates heat in the cylindrical portion 27 of the inductor drum assembly 25. The generation of eddy currents in the cylindrical portion 27 increases the temperature of the entire inductor drum assembly 25 although the greatest amount of heat is generated in the cylindrical portion of the inductor drum 27 which is disposed adjacent to the pole faces 43. The heat generated in the cylindrical portion 27 of the inductor drum is transferred by conduction to the radially extending portion 37 of the inductor drum assembly 25.

The heat generated in the cylindrical portion 27 of the inductor drum will follow the direction of arrows 81 in FIG. 3 and will travel through the cylindrical portions 27, to the radially extending portion 26, through the rivets 77, to the fins 75 for dissipation in the air. It should be appreciated that the circumferential area of contact between the rivets 77 and the openings 79 provides a major thermo conductive path for directing heat from the inductor drum assembly 25 to the fins 75. Thus, it is important to maintain a certain minimum relationship between the total circumferential contact area between the plurality of rivets 77 and the plurality of openings 79 and a cross sectional area of the cylindrical portion 27 of the inductor drum taken approximately perpendicular to the axis of rotation in a portion of the cylindrical portion 27 of the inductor drum assembly disposed adjacent to the pole faces 43. Ideally, the total circumferential contact area between all of the plurality of rivets 77 and openings 79 is approximately equal to the cross sectional area of the cylindrical portion 27 of the inductor drum 25 taken perpendicular to the axis of rotation adjacent to pole faces 43 as this will allow the rivets 77 to transfer heat to the fins 75 at the same rate heat is being transferred from the cylindrical portion 27 of the inductor drum assembly to the radially extending portion 26 of the inductor drum assembly 25. In actual practice, the total circumferential contact area between the plurality of rivets 77 and openings 79 is preferably greater than one and a quarter or 125% of the cross-sectional area of the cylindrical portion 27 of the inductor drum assembly taken perpendicular to the axis of rotation. It has been found that the contact between the radially extending portion 26 of the inductor drum assembly and the surface of the cylindrical ring portion 73 disposed contiguous thereto also acts to thermally conduct heat from the radially extending portion 26 of the inductor drum assembly 25 to the fins 75 of the heat dissipating member 71. However, a major portion of the heat conducted from the inductor drum assembly 25 to the heat dissipating member 71 is through the rivets 77 due to their compressive relationship with openings 79 and due to the fact that the rivets, are integrally constructed with the heat dissipating member 71. The heat dissipating member 71 and rivets 77 are constructed of aluminum which acts exceptionally well to conduct heat away from the inductor drum assembly 25. This construction provides a distinct advantage over the aluminum fin construction shown in the Jaeschke U.S. Pat. No. 3,316,429 due to the significantly lower cost of die casting the heat dissipating member 71 and attaching it to the drum assembly 25 with integral rivets 77 versus attempting to die cast the aluminum heat dissipating member directly to the drum assembly 25.

While the present invention has been specifically disclosed as being utilized on an eddy current coupling it should be appreciated that it could be utilized in other types of appartatus, such as friction brakes or eddy current brakes, which generate heat in a metallic member during an operative association of a first and a second mechanism.

From the foregoing it should be apparent that a new and improved eddy current coupling 11 has been provided. The coupling includes an input member 19, an output member 21, a pole assembly 29 and an inductor drum assembly 25. A field coil 41 is supported by the pole assembly 29 and is operable to couple the input and output members upon energization thereof. The inductor drum assembly 25 includes a generally cylindrically drum portion 27 extending substantially parallel to the axis of rotation and a radially extending portion 26 extending substantially perpendicular to the axis of rotation. A heat dissipating member 71 is integrally formed from a heat conductive material and is attached to the radially extending portion 26 of the inductor drum assembly 25. The heat dissipating member 71 includes a heat dissipating surface having heat dissipating fins 75 on one side thereof for directing heat from the heat dissipating member 71 and rivet means 77 extending from the opposite side thereof for connecting the integrally formed heat dissipating member 71 to the radially extending portion 26 of the inductor drum assembly 25. The rivet means 77 act to transfer heat from the inductor drum assembly 25 to the heat dissipating member 71 for dissipation thereof as the fins 75 rotate with the inductor drum assembly 25.

What I claim is:

1. An eddy current coupling comprising an input member, an output member rotatable relative to said input member about an axis of rotation, a pole assembly associated with one of said input and output members, an inductor member associated with the other of said input and output members, a field coil associated with said pole assembly for coupling said input and output members upon energization of said field coil, said field coil when energized establishing a flux path from said field coil, through said pole assembly, through said inductor member and back through said pole assembly to said field coil, said inductor member including a generally cylindrical drum portion extending substantially parallel to said axis of rotation and a radially extending portion extending substantially perpendicular to said axis of rotation, and a heat dissipating member integrally formed from heat conductive material attached to said radially extending portion of said inductor member, said heat dissipating member including a heat dissipating surface on one side thereof for directing heat from said heat dissipating member and rivet means extending from the opposite side thereof for connecting said integrally formed heat dissipating member to said radially extending portion of said inductor member, said rivet means acting to transfer heat from said inductor member to said heat dissipating member.

2. An eddy current coupling as defined in claim 1 wherein said rivet means are formed from a material having a greater coefficient of expansion than the material from which said inductor member is formed.

3. An eddy current coupling as defined in claim 2 wherein said radially extending portion of said inductor member includes a plurality of openings therein extending substantially parallel to said axis of rotation, said rivet means includes a plurality of rivets extending from said opposite side of said heat dissipating member in a direction substantially parallel to said axis of rotation, said plurality of openings each receiving one of said rivets therein to support said heat dissipating member, said inductor member and said heat dissipating member expanding upon being subject to heat and wherein said rivets expand at a rate greater than the expansion rate of said plurality of openings in said inductor member to increase the thermal contact between said rivets and said inductor member upon heating of said inductor member and said heat dissipating member.

4. An eddy current coupling as defined in claim 3 wherein said rivets are in a state of compression when received in said plurality of openings in said heat dissipating member.

5. An eddy current coupling as defined in claim 3 wherein the circumferential contact area between said plurality of rivets and said plurality of openings in said inductor member is equal to or greater than one hundred twenty five percent (125%) of the cross-sectional area of said cylindrical portion of said inductor member taken substantially perpendicular to said axis of rotation.

6. An eddy current coupling as defined in claim 1 wherein said heat dissipating surface on said one side of said heat dissipating member includes a plurality of cooling fins extending in a direction substantially parallel to said axis of rotation.

7. An eddy current coupling as defined in claim 5 wherein said heat dissipating surface on said one side of said heat dissipating member includes a plurality of cooling fins extending in a direction substantially parallel to said axis of rotation.

8. An eddy current coupling as defined in claim 2 wherein said rivet means are integrally formed in said heat dissipating member.

9. An eddy current coupling as defined in claim 3 wherein said heat dissipating member has an annular configuration disposed substantially concentric to said axis of rotation, said radially extending portion of said inductor member has a substantially annular surface thereon, and said rivets connect said annular heat dissipating member to said annular surface of said inductor member to provide a heat path from said inductor member to said heat dissipating member.

10. An eddy current coupling as defined in claim 5 wherein said heat dissipating member has an annular configuration disposed substantially concentric to said axis of rotation, said radially extending portion of said inductor member has a substantially annular surface thereon, and said rivets connect said annular heat dissipating member and said annular surface of said inductor member to provide a heat path from said inductor member to said heat dissipating member.

11. An eddy current coupling as defined in claim 9 wherein said rivets are integrally formed in said heat dissipating member, said heat dissipating member including an annular surface thereon and said rivets extending in a direction substantially parallel to said axis of rotation from said annular surface, said rivets when disposed in said openings in said inductor member locating said annular surface of said heat dissipating member contiguous to said annular surface of said inductor member.

12. An eddy current coupling as defined in claim 11 wherein said cylindrical portion of said inductor member includes a plurality of axially extending teeth at one end thereof for dissipating heat from said inductor member.

13. An eddy current coupling as defined in claim 11 wherein said cylindrical portion of said inductor member includes a plurality of radially extending openings therein for dissipating heat from said inductor member.

14. An eddy current coupling as defined in claim 12 wherein said cylindrical portion of said inductor member includes a plurality of radially extending openings therein for dissipating heat from said inductor member.

* * * * *